United States Patent
Knight et al.

(10) Patent No.: US 6,581,579 B1
(45) Date of Patent: Jun. 24, 2003

(54) VAPOR SEPARATOR FOR A FUEL PUMP ASSEMBLY

(75) Inventors: David L. Knight, Cass City, MI (US); Ronald H. Roche, Cass City, MI (US); Roger N. Smith, Caro, MI (US)

(73) Assignee: Walbro Engine Management, L.L.C., Cass City, MI (US)

( * ) Notice: Subject to any disclaimer, the term of this patent is extended or adjusted under 35 U.S.C. 154(b) by 0 days.

(21) Appl. No.: 10/175,223

(22) Filed: Jun. 19, 2002

(51) Int. Cl.[7] ............................................. F02M 37/04
(52) U.S. Cl. ...................... 123/516; 123/541; 137/574
(58) Field of Search ................................ 123/514, 516, 123/541, 557, 509; 137/589, 574, 507

(56) References Cited

U.S. PATENT DOCUMENTS

| | | | |
|---|---|---|---|
| 1,782,602 A | * 1/1930 | Brush | 123/557 |
| 4,218,999 A | * 8/1980 | Shearer | 123/557 |
| 4,625,694 A | * 12/1986 | Adey et al. | 123/450 |
| 4,829,969 A | * 5/1989 | Ray | 123/557 |
| 4,938,036 A | * 7/1990 | Hodgkins et al. | 62/323.1 |
| 5,103,793 A | * 4/1992 | Riese et al. | 123/516 |
| 5,139,000 A | * 8/1992 | Sawert | 123/514 |
| 5,251,603 A | * 10/1993 | Watanabe et al. | 123/541 |
| 5,309,885 A | 5/1994 | Rawlings et al. | 123/509 |
| 5,887,555 A | * 3/1999 | Schmitz | 123/41.31 |
| 5,908,020 A | * 6/1999 | Boutwell et al. | 123/541 |
| 5,964,206 A | * 10/1999 | White et al. | 123/541 |
| 6,173,915 B1 | * 1/2001 | Cohen et al. | 239/585.1 |
| 4,989,568 C1 | 1/2002 | Sougawa | 123/456 |

* cited by examiner

Primary Examiner—Carl S. Miller
(74) Attorney, Agent, or Firm—Reising, Ethington, Barnes, Kisselle

(57) ABSTRACT

A fuel pump assembly for use with a fuel injected combustion engine has a liquid cooled vapor separator from which conditioned fuel is drawn by a high pressure fuel pump. The vapor separator has an internal heat conductive sleeve which defines a fuel chamber or reservoir. A coolant chamber surrounds the heat conducting sleeve and is carried laterally between an exterior housing of the fuel pump assembly and the internal sleeve. A coiled baffle disposed within the coolant chamber forms a coolant channel which spirals about the sleeve. The channel has a first end which communicates with a coolant passage inlet and an opposing second end which communicates with a coolant passage outlet carried by the housing. The introduction of the baffle, therefore the channeling of coolant flow through the spiraling channel, improves the fuel cooling efficiency of the vapor separator by eliminating hot spots created by stagnate or non-flowing coolant areas within the coolant chamber.

14 Claims, 4 Drawing Sheets

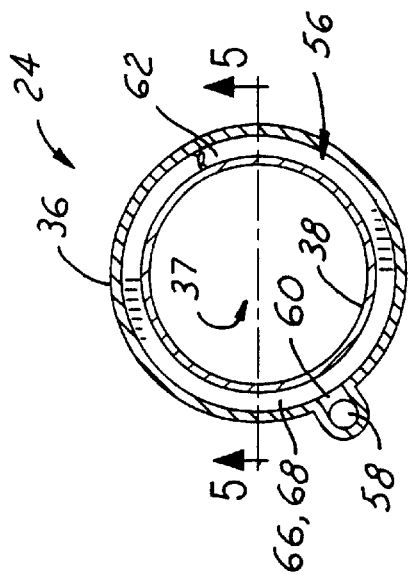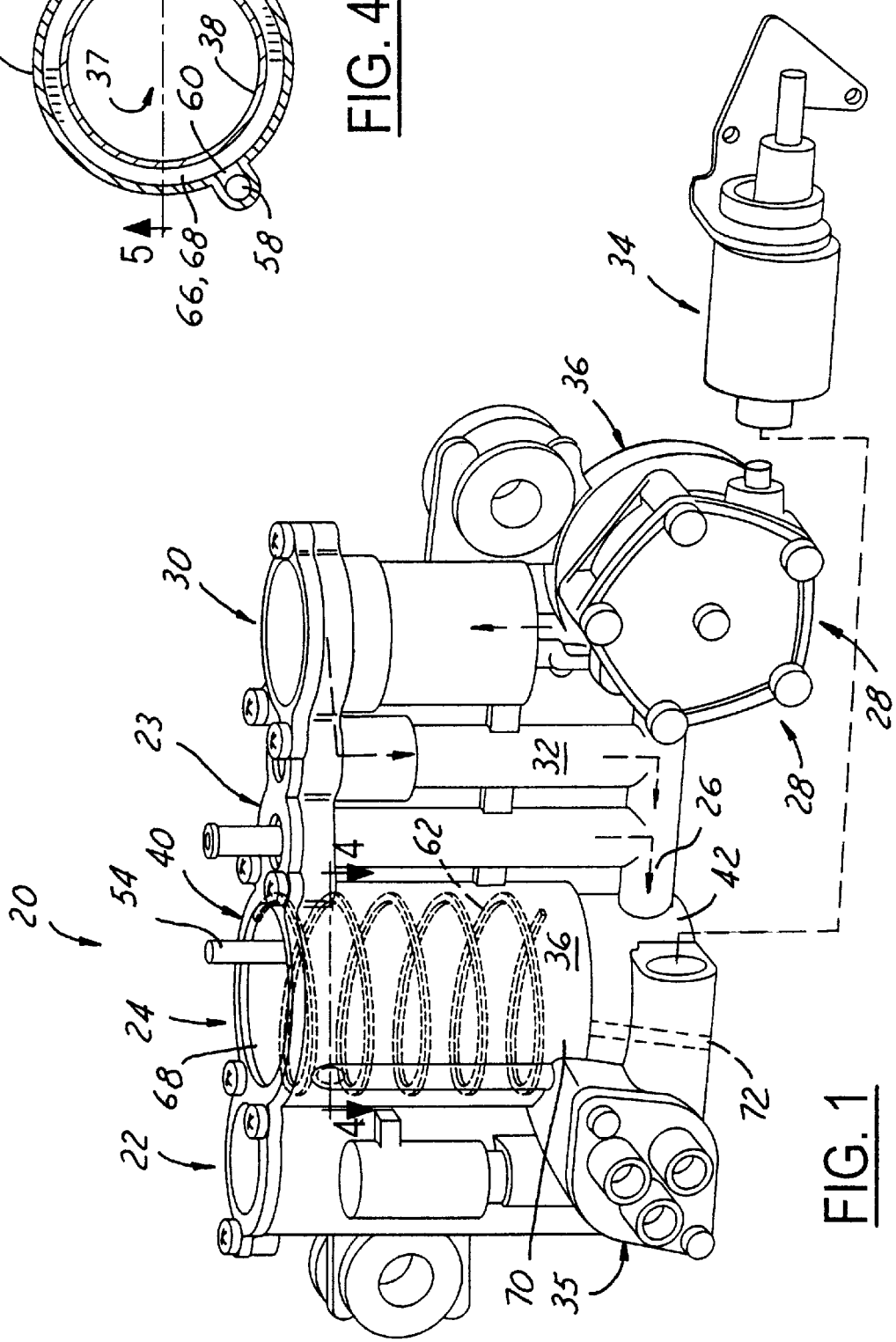

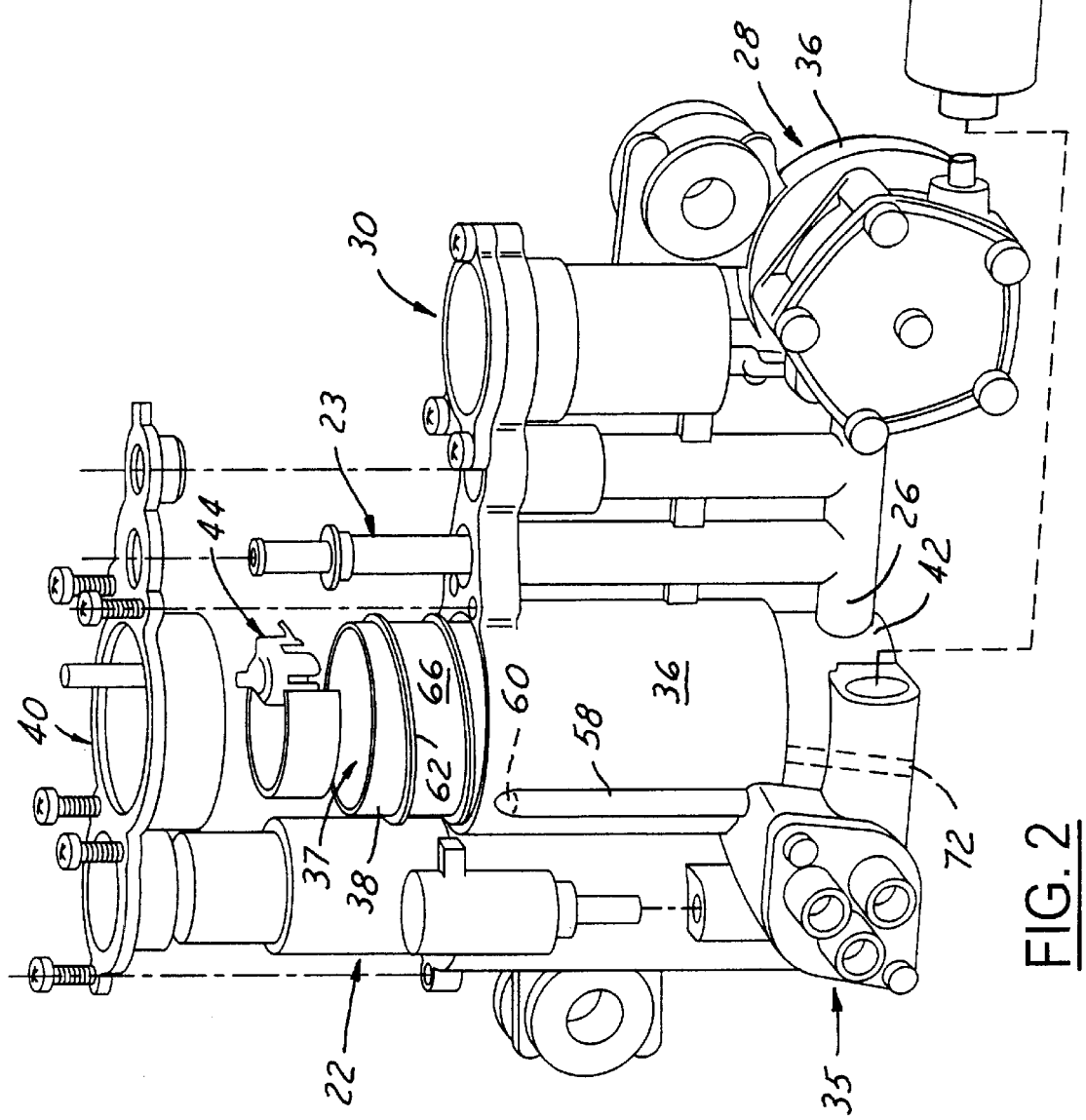

VAPOR SEPARATOR FOR A FUEL PUMP ASSEMBLY

TECHNICAL FIELD OF THE INVENTION

This invention relates generally to a fuel vapor separator and more particularly to a fuel vapor separator for a high pressure fuel pump assembly of a combustion engine.

BACKGROUND OF THE INVENTION

Combustion engines utilizing fuel injection systems for delivering fuel to the combustion chambers typically include a fuel pump assembly having a high pressure fuel pump and a vapor separator which acts as a fuel reservoir for supplying fuel directly to the high pressure fuel pump. The fuel pump delivers the fuel to a closed loop or recirculating fuel rail from which the fuel injectors draw fuel. A fuel pressure regulator controls the fuel pressure within the rail and is commonly mounted on the return or downstream end just prior to the fuel being returned into the vapor separator which is held at a substantially lower pressure.

For two-cycle engine applications, the fuel pump assembly commonly has a remote low pressure diaphragm fuel pump which is actuated by pressure pulses received from the crankcase of a running engine. The low pressure fuel pump delivers fuel from a remote fuel tank to the vapor separator, and often through a fuel filter mounted just upstream of the vapor separator. Again for two-cycle engine applications, the fuel pump assembly may include an oil injection pump or device which emits measured amounts of oil directly into the crankcase for lubrication and on occasion into the fuel reservoir of the vapor separator to achieve cleansing and lubrication of the fuel injectors. An oil gallery may also be mounted to the fuel pump assembly which routes oil from the oil pump to bearings contained within the crankcase chamber.

Unfortunately, the fuel entering the fuel chamber of the vapor separator from the fuel rail is often heated to excessive temperatures which if not addressed would substantially reduce the pumping efficiency of the high pressure fuel pump and create excessive fuel vapors which can lead to vapor lock within the rail, or injectors, causing the engine to run rough or stall altogether. The fuel is heated by exposure of the fuel rail to the heat being dissipated from the nearby engine block of a running two or four cycle engine, by the heat generated from any electrical solenoids of the running injectors, and from the energy produced by the electrical high pressure fuel pump, especially when the pump is rated at 24 or 48 volts. The generation of fuel vapor becomes pronounced when the pressurized hot fuel flows past the pressure regulator and dumps into the vapor separator at a much lower pressure, near atmosphere. The vapor is released through a vapor outlet passage carried by the vapor separator, and the liquid fuel within the vapor separator is cooled by a liquid coolant. The vapor outlet passage is open and closed by a float device which actuates upon low and high fuel levels within the fuel chamber of the vapor separator. The low pressure diaphragm fuel pump provides make-up fuel to the fuel chamber to stabilize fuel levels as the high pressure fuel delivers fuel from the vapor separator.

The coolant flows through a jacket or annular coolant chamber which surrounds the fuel chamber and is defined radially between a sleeve and an exterior housing. The sleeve is made of a heat conductive metal and performs as a structural barrier to keep the fuel and water separated and to promote the conduction of heat from the hot fuel to the colder coolant. For marine engine applications, such as personal or pleasure watercraft and outboard engine applications, the coolant is typically water. When the water flows directly from the body of water that the watercraft floats in, the coolant chamber of the vapor separator is exposed directly to either fresh (non-salt) or salt water. Either form, and especially salt water is corrosive to a variety of metals, therefore, to promote heat transfer yet reduce corrosion, the sleeve is made of expensive stainless steel, or aluminum having a corrosion resistant coating.

Because the water or coolant chamber is annular in shape, areas of stagnate water are present within the chamber which creates hot spots and degrades heat transfer from the fuel chamber to the coolant chamber.

SUMMARY

A fuel pump assembly for use with a fuel injected combustion engine has a liquid cooled vapor separator from which conditioned fuel is drawn by a high pressure fuel pump. The vapor separator has an internal heat conductive sleeve which defines a fuel chamber or reservoir. A coolant chamber surrounds the heat conducting sleeve and is disposed between an exterior housing of the fuel pump assembly and the internal sleeve. A baffle, preferably coiled, is disposed within the coolant chamber and forms a coolant channel which spirals about the exterior of the sleeve. The channel has a first end which communicates with a coolant passage inlet and an opposing second end which communicates with a coolant passage outlet carried by the housing. The introduction of the baffle channels coolant flow through the preferably spiraling channel which improves the fuel cooling efficiency of the vapor separator. The baffle eliminates hot spots created by stagnate or non-flowing coolant areas within the coolant chamber.

Preferably, the housing is an integral part of the fuel pump assembly and supports the high pressure fuel pump along with numerous other components such as a fuel filter and a low pressure diaphragm fuel pump. The sleeve extends axially between an upper cap and opposite lower cap of the vapor separator. The upper cap carries a vapor outlet passage which opens on reservoir low fuel level and closes on reservoir high fuel level via a float device contained within the fuel chamber. The lower cap is preferably a unitary part of the housing.

Because the coolant may be salt water, which is particularly corrosive when heated, the sleeve must not only transfer heat from the fuel chamber to the coolant chamber, but it must be resistant to corrosion. Therefore, the sleeve is preferably made of metal such as stainless steel or aluminum having a corrosion resistant coating. Should the baffle be formed unitary to the sleeve, the sleeve is preferably made of a heat conductive injection molded plastic.

Objects, features and advantages of this invention include a vapor separator having a significantly improved cooling efficiency via introduction of a baffle. The invention may be readily incorporated into existing fuel pump assembly designs, improves high pressure fuel pump efficiency, reduces the potential for vapor lock within the fuel system, is of relatively simple design and economical manufacture and assembly and in service has a significantly increased useful life.

BRIEF DESCRIPTION OF THE DRAWINGS

These and other objects, features and advantages of this invention will be apparent from the following detailed description of the preferred embodiments and best mode, appended claims and accompanying drawings in which:

FIG. 1 is a perspective view of a fuel pump assembly of the present invention;

FIG. 2 is an exploded view of the fuel pump assembly;

FIG. 3 is a perspective view of a coiled baffle of a vapor separator of the fuel pump assembly;

FIG. 4 is a cross sectional view of the vapor separator taken along line 4—4 of FIG. 1;

DETAILED DESCRIPTION OF THE PREFERRED EMBODIMENTS

Figure 5:
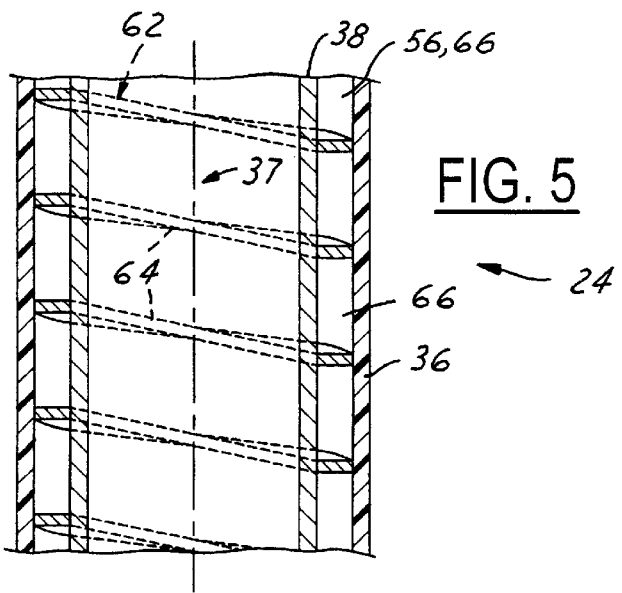
FIG. 5 is a fragmentary longitudinal cross section view of the vapor separator taken along line 5—5 of FIG. 4.

Referring to FIGS. 1 and 2, a fuel pump assembly or module 20 embodying the present invention supplies high pressure fuel, via an electric high pressure fuel pump 22, to a fuel injected combustion engine (not shown). Fuel flow direction is shown by the arrows of FIG. 1. The high pressure fuel enters a closed loop fuel injector rail (not shown) and is routed to a series of fuel injectors that respectively feed a series of combustion chambers of the engine. Excess fuel which is not emitted or which does not flow to the combustion chamber via the fuel injectors is re-routed typically through a fuel pressure regulator 23 and back to a vapor separator 24 of the fuel pump assembly 20. Fuel entering the fuel pump 22 from the vapor separator 24 must be conditioned to eliminate pump cavitation and achieve maximum pump efficiency and avoid the presence of fuel vapor within the fuel rail and/or injectors that can cause vapor lock, rough engine running conditions and/or stalling of the engine. Because the pressurized return fuel is typically heated, and the pressure drop across the pressure regulator promotes the production of fuel vapor within the vapor separator 24, the separator both cools the fuel via heat transfer and reduces stored energy within the fuel via the release of fuel vapor. The supply of fuel to the fuel rail is initially heated by the working of the fuel and the heat dissipated from the electric motor of the high pressure drive fuel pump 22. This is especially true when a twenty-four or forty-eight volt fuel pump electric motor is utilized. As the fuel flows through the closed loop rail, heat being emitted from the engine block and heat produced by the solenoid operated fuel injectors further elevates the temperature of the fuel, so that the fuel is substantially hot when it exits the fuel rail pressure regulator and flows through a fuel inlet passage 26 of the vapor separator 24.

The fuel pump assembly 20 normally has a low pressure fuel pump 28, particularly for two cycle engine applications, which pumps fuel through a fuel filter 30 via pressure pulses sent from a crankcase of the two-cycle engine. From the fuel filter 30, the fuel flows into the vapor separator 24 via a make-up fuel inlet passage 32 which connects with the inlet passage 26. When utilized with a two-cycle engine application, the fuel pump assembly 20 may include an oil pump 34 capable of feeding the correct amounts of lubricating oil into a low pressure fuel such as gasoline at, or just prior to entering, the vapor separator 24. An oil gallery 35 which delivers oil via the oil pump 34 into the crankcase to lubricate bearings of the two-cycle engine is conveniently mounted to the fuel pump assembly 20. The high pressure fuel pump 22, vapor separator 24, fuel filter 30, fuel pressure regulator 23, low pressure fuel pump 28, and oil gallery 35 are of module form and carried by a preferably one piece injection molded plastic housing 36.

Figure 8:
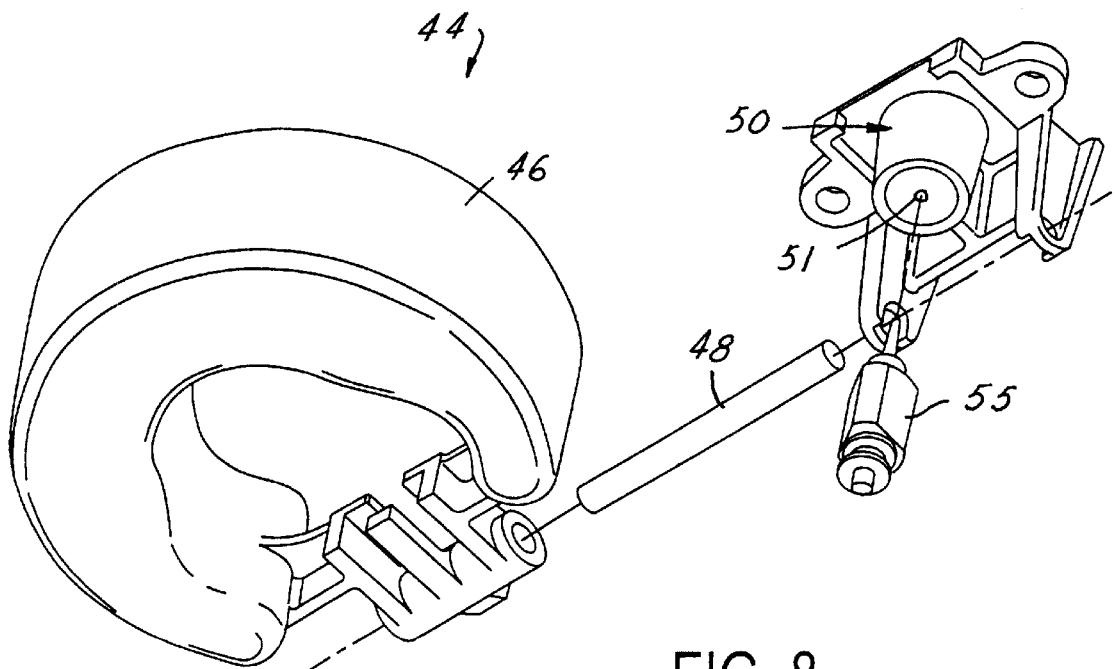
FIG. 8 is an exploded perspective view of a float assembly of the vapor separator.
Figure 9:
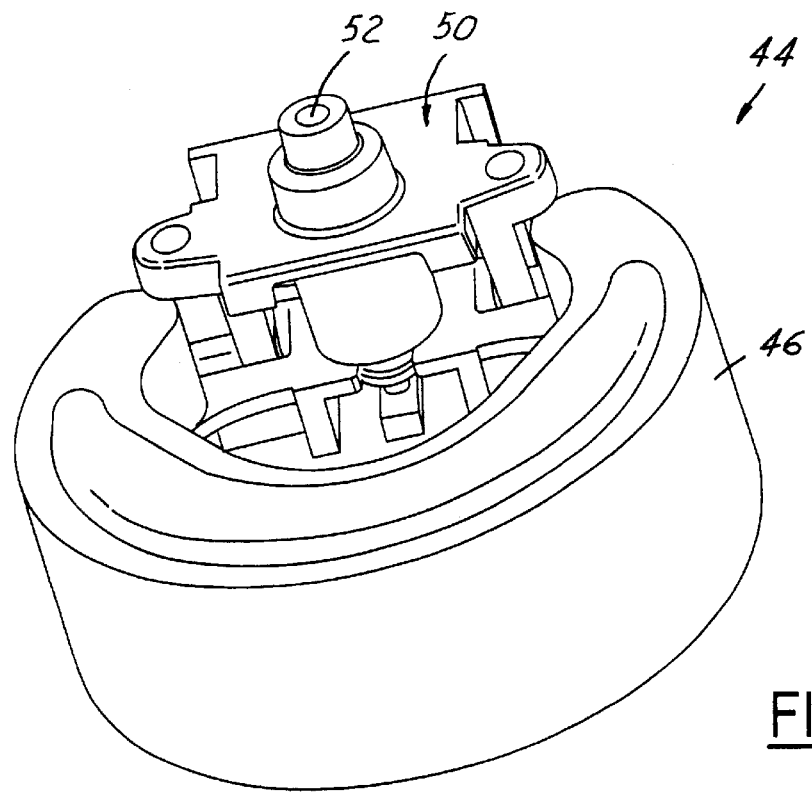
FIG. 9 is a perspective view of the float assembly of the vapor separator.

Referring to FIGS. 2–5, a fuel chamber 37 of the vapor separator 24 is defined radially by a water jacket or sleeve 38 made of a non-corrosive and heat conductive material such as stainless steel or aluminum having a corrosion resistant coating. The fuel chamber 37 is defined axially between a first or upper cap 40 and a second or lower cap 42. As illustrated in FIG. 2, the lower cap 42 is formed unitary, is one piece, to the housing 36 and the upper cap 40 is also the upper cap of the high pressure fuel pump 22. The fuel chamber 37 acts as a reservoir for supplying conditioned fuel to the high pressure fuel pump 22. The level of fuel within the reservoir and therefore the volume of fuel vapor formed above the liquid fuel level is controlled via a float valve device 44, as best shown in FIGS. 2, 8 and 9. The float valve device 44 engages the upper cap 40 and has a hollow plastic float 46. The float 46 pivots about a metal hinge pin 48 carried by a plastic molded body 50 with a seat 51 and a vapor vent communicates through passage 52 which communicates openly with the fuel chamber 37 with a vapor outlet passage 54 carried by the upper cap 40. The body 50 is carried by the upper cover or cap 40. A valve head or needle 55 is engaged at one end to the float 46 and is positioned to bear on the seat 51 to close or obstruct the vapor outlet passage 54 as the float 46 pivots upward upon rising or high liquid fuel levels and to disengage from the seat 51 to open the vapor outlet passage 54 upon low liquid fuel levels. When passage 54 is open, fuel vapor is discharged from the chamber 37 and the pressure within the fuel chamber 37 drops thereby permitting make-up fuel to enter the fuel chamber 37 via the low pressure diaphragm fuel pump 28 until the passage 54 once again closes via the float valve device 44.

A coolant chamber 56 circumferentially surrounds the fuel chamber 37 and is defined radially between the exterior housing 36 and the interior sleeve 38. Like the fuel chamber 36, the coolant chamber 56 is defined axially between the upper and lower caps 40, 42. A liquid coolant inlet passage 58 is carried by the housing 36 and has a coolant inlet port 60 communicating with the coolant chamber 56 and disposed near the upper cap 40, s best shown in FIG. 4.

To eliminate stagnate areas of liquid coolant within the coolant chamber 56, thereby improving coolant efficiency, a coiled baffle 62 is loosely fitted within the coolant chamber 56 between the housing 36 and the sleeve 38, as best shown in FIGS. 3–5. The coiled baffle 62 has a plurality of windings or coils 64 which wind about the sleeve 38. In assembly, the coiled baffle 62 forms a spiral coolant channel 66 having a first or upper end 68 which communicates with the coolant inlet port 60 and a second or lower end 70 which communicates with a liquid coolant outlet passage 72 carried by the integral lower cap 42 as shown in phantom in FIGS. 1 and 2. The flow of coolant thus enters at the top of the coolant chamber 56 spirals about the sleeve 38 or fuel chamber 37 via the coolant channel 66 and exits the coolant chamber 56 via the water outlet passage 72 at the bottom of the chamber 56. This provides counter flow and maximum coolant efficiency.

Each coil 64 has a substantially rectangular cross sectional area defined laterally between 74 which faces the housing 36 and an inward radial edge 76 which faces the sleeve 38 to produce the spiraling water flow through the channel 66. To promote ease of assembly, the an outward radial edge edges 74, 76 of the baffle 62 are not engaged tightly to either adjacent surfaces, but are held at close proximity thereto. The coiled baffle 62 is made of a non-corrosive material such as plastic or stainless steel.

Figure 6:
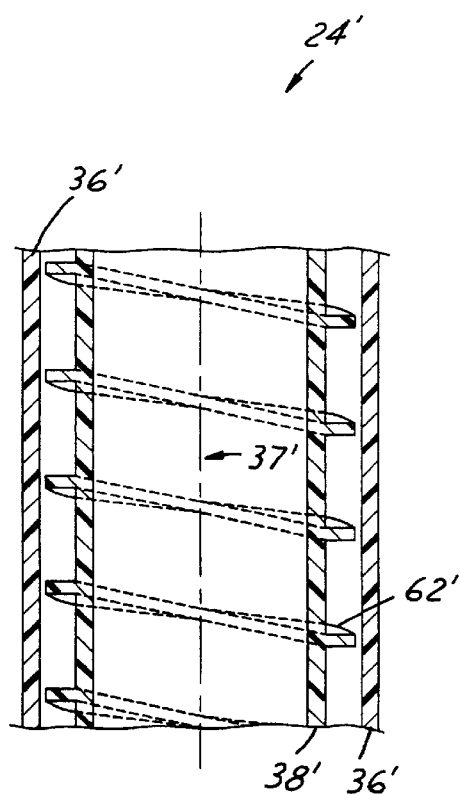
FIG. 6 is a fragmentary longitudinal cross sectional view of a second embodiment of a vapor separator similar in perspective to FIG. 5.

Referring to FIG. 6, a second embodiment of a vapor separator 24' is shown having a coiled baffle 62' formed unitarily as part of a sleeve 38'. The baffle 62' and the sleeve 38' are injection molded in one piece of a thermally conductive plastic material. Both may then be inserted into a housing 36' also made of plastic. One such thermally conductive plastic is CoolPoly RS007 or CoolPoly RB020, manufactured by Cool Polymers, Inc., Atlanta, Ga., U.S. The transfer of heat across a CoolPoly plastic is substantially similar to aluminum but does not require a corrosion resistant coating and is approximately forty percent lighter in weight. Yet another source of thermally conductive plastics is RTP Company, Winona, Minn., U.S.

Figure 7:
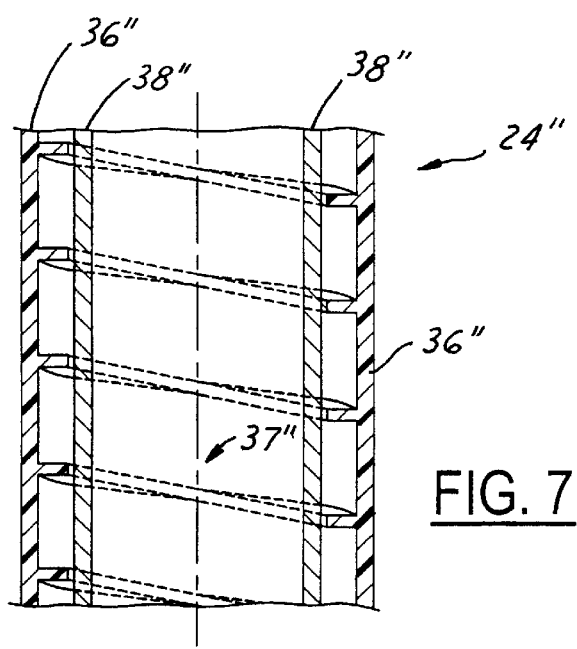
FIG. 7 is a fragmentary longitudinal cross sectional view of a third embodiment of a vapor separator similar in perspective to FIG. 5.

Referring to FIG. 7, a third embodiment of a vapor separator 24" is shown having a coiled baffle 62" formed unitarily as part of a housing 36" and projecting radially inward toward a sleeve 38". The baffle 62" and the housing 36" are made of injection molded plastic which need not be thermally conductive. The sleeve 38" is made of a non-corrosive metal such as stainless steel.

While the forms of the invention herein disclosed constitute presently preferred embodiments, many others are possible. It is not intended herein to mention all the possible equivalent forms or ramifications of the invention. It is further understood that the terms used herein are merely descriptive rather than limiting, in that various changes may be made without departing from the spirit or scope of this invention as defined by the following claims.

What is claimed is:

1. A vapor separator for a fuel pump assembly of an internal combustion engine comprises:
   a first cap defining a vapor outlet passage and a second cap spaced from the first cap;
   an elongated heat conductive sleeve disposed between the first cap and second cap and defining a fuel chamber at least selectively communicated with the vapor outlet passage;
   a float valve device carried by the first cap, disposed within the fuel chamber and constructed and arranged to close and open the vapor outlet passage with rising and lowering fuel levels within the fuel chamber;
   a housing surrounding and spaced laterally outward from the sleeve;
   an elongated baffle extended laterally between the housing and the sleeve;
   a coolant channel defined longitudinally by the baffle and carried between the housing and the sleeve, the coolant channel being segregated from the fuel chamber and having a first end and an opposite second end;
   a coolant inlet passage communicating with the first end of the coolant channel; and
   a coolant outlet passage communicating with the second end of the coolant channel.

2. The vapor separator set forth in claim 1 wherein the baffle is coiled arid has a plurality of windings, and wherein the coolant channel is spiraled and defined laterally between a winding and a next adjacent winding.

3. The vapor separator set forth in claim 1 wherein the first end of the coolant channel is disposed near the first cap and the second end of the coolant channel is disposed near the second cap.

4. The vapor separator set forth in claim 1 wherein the second cap is unitary and one piece to the housing.

5. The vapor separator set forth in claim 4 wherein the second cap carries a fuel inlet passage.

6. The vapor separator set forth in claim 5 wherein the housing carries the coolant inlet passage and has a coolant inlet port disposed near the upper cap.

7. The vapor separator set forth in claim 2 wherein the coiled baffle is unitary and one piece to the sleeve.

8. The vapor separator set forth in claim 7 wherein the sleeve and the baffle are injection molded of a thermally conductive plastic.

9. The vapor separator set forth in claim 2 wherein the coiled baffle is unitary and one piece to the housing.

10. The vapor separator set forth in claim 2 wherein the coiled baffle is loosely fitted between the housing and the sleeve.

11. The vapor separator set forth in claim 4 wherein the housing is integral to a high pressure fuel pump of the fuel pump assembly.

12. The vapor separator set forth in claim 11 wherein the housing is integral to a low pressure diaphragm fuel pump of the fuel pump assembly.

13. A fuel pump assembly for an internal combustion engine comprising:
    a housing;
    an electric high pressure fuel pump supported by the housing; and
    a vapor separator supported by the housing, the vapor separator having:
       a first cap defining a vapor outlet passage and an opposing second cap defined by the housing, wherein the housing extends axially between the first and second caps,
       a heat conductive cylindrical sleeve engaged axially between the first and second caps and spaced radially inward from the housing,
       a fuel chamber defined within the sleeve,
       a coiled baffle spiraling between the housing and the sleeve and extending longitudinally between the first and second caps, the baffle having a plurality of windings spaced axially with respect to the vapor separator, wherein each winding extends laterally radially between the housing and the sleeve,
       a spiral coolant channel defined between the housing, the sleeve and the baffle, the coolant channel having a first end disposed near the first cap and an opposite second end disposed near the second cap,
       a coolant inlet passage communicating with the first end of the coolant channel, and
       a coolant outlet passage communicating with the second end of the coolant channel.

14. A vapor separator for a fuel pump assembly of an internal combustion engine comprises:
    an elongated heat conductive sleeve defining a fuel chamber;
    a housing surrounding and spaced laterally outward from the sleeve;
    an elongated baffle extended laterally between the housing and the sleeve;
    a coolant channel defined longitudinally by the baffle and carried between the housing and the sleeve, the coolant channel being segregated from the fuel chamber and having a first end and an opposite second end;
    a coolant inlet passage communicating with the first end of the coolant channel;
    a coolant outlet passage communicating with the second end of the coolant channel; and
    wherein the heat conductive sleeve is formed from thermally conductive plastic.

* * * * *